(No Model.) 2 Sheets—Sheet 2.
W. H. WILSON.
PLOW.
No. 459,667. Patented Sept. 15, 1891.
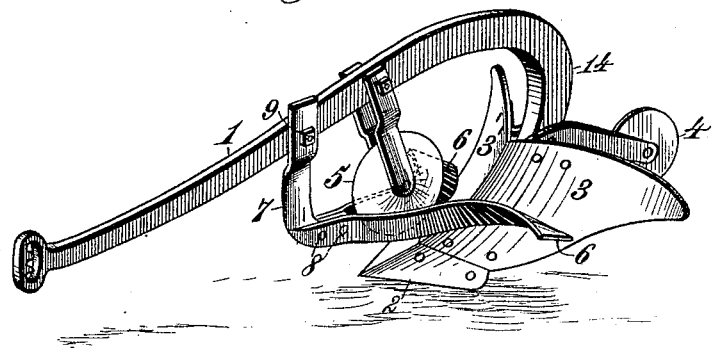
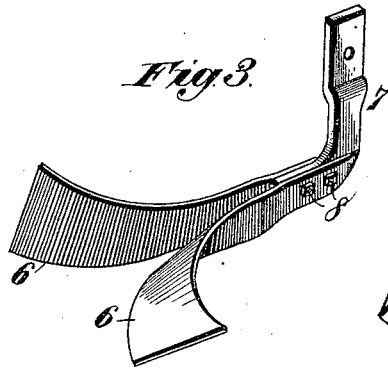
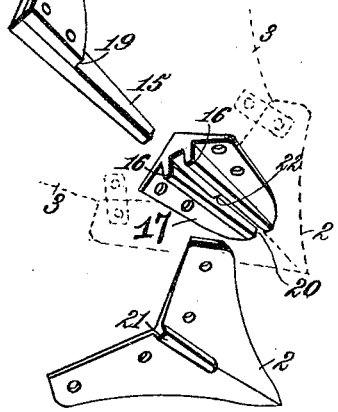
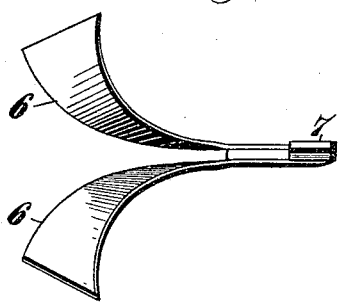
Witnesses:
Robt Pratt
J. A. Rutherford
Inventor:
William H. Wilson,
By James L. Norris,
Atty.

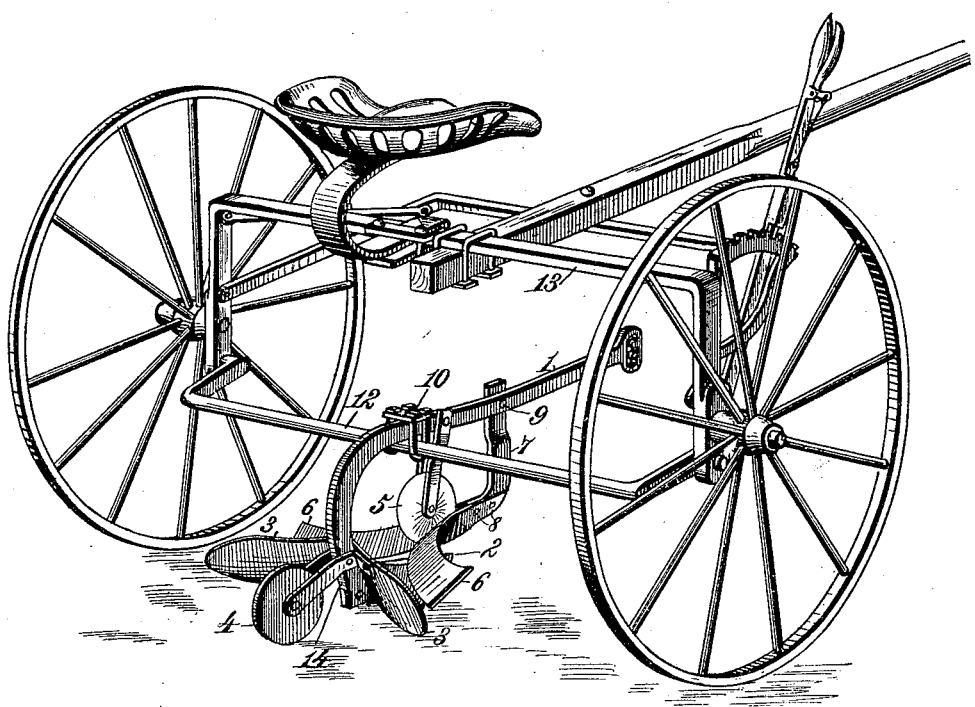

UNITED STATES PATENT OFFICE.

WILLIAM H. WILSON, OF GROESBECK, TEXAS.

PLOW.

SPECIFICATION forming part of Letters Patent No. 459,667, dated September 15, 1891.

Application filed December 31, 1890. Serial No. 376,351. (No model.)

*To all whom it may concern:*

Be it known that I, WILLIAM H. WILSON, a citizen of the United States, residing at Groesbeck, in the county of Limestone and State of Texas, have invented new and useful Improvements in Plows, of which the following is a specification.

This invention relates more particularly to double-mold-board plows, but it is applicable to ordinary sulky and other plows having a rotary colter over the plowshare and a friction-wheel which acts as a rotating support or sole in rear of the plow.

The object of my invention is to provide a novel, simple, and efficient duplex guard for spreading and laying or forcing downward cotton or corn stalks which are to be cut by the colter and covered with soil by the plow.

The invention also has for its object to provide a novel stalk spreading and laying guard which comprises a peculiarly-curved plate in front of each mold-board with a single shank for attaching both plates to the plow-beam.

This invention also has for its object to provide novel means for connecting the sole of the plow standard or beam with the plowshare and mold-boards.

To accomplish all these objects my invention consists in the features of construction and the combination or arrangement of parts hereinafter described and claimed, reference being made to the accompanying drawings, in which—

Figure 1 is a perspective view of a sulky-plow embodying my invention. Fig. 2 is a detail perspective view of the plow. Fig. 3 is a detail perspective view of the duplex guard. Fig. 4 is a top plan view of the same. Fig. 5 is a detail perspective view of portions of the plow to show the means for connecting the sole of the standard or beam with the share and mold-boards.

In order to enable those skilled in the art to make and use my invention, I will now describe the same in detail, referring to the accompanying drawings, wherein—

The numeral 1 indicates a plow-beam; 2, the plowshare, and 3 the double mold-boards. The plow may be connected with a wheeled frame, after the manner of an ordinary sulky-plow, as in Fig. 1, or it may be provided with handles for guiding it, as when the plowman walks. The plow is provided at the rear with a friction-wheel 4, which acts as a rotating support or sole and lessens friction, and to the beam is secured the support of a rotary colter 5, which is suspended between the two rearwardly-diverging plates or wings 6 of the improved duplex guard. These plates respectively overhang the two mold-boards and at their forward ends are flat and joined by bolts 8 or otherwise to opposite sides of a vertical shank 7, which is secured by a suitable clamp-bolt 9 or other device to the plow-beam, whereby the single shank serves to support and attach both guard-plates. The guard-plates diverge rearwardly from the shank and uniformly curve laterally in opposite directions, while they increase in width from front to rear. The rear outwardly-curved extremities overhang and stand considerably above the plane of the plow-point, and the front acting faces of the curved portions of the plate are inclined rearward from the upper to the lower edge, the construction being such that the stalks are first divided, then spread laterally, and then pressed downward upon the soil in a forward direction.

In practice the plow is run on the row of cotton or corn stalks so that the guard divides and spreads the same laterally in opposite directions. The curved extremities of the guard-plates press the stalks downward, while the colter cuts them and the plow covers the same with soil. The shank of the duplex guard may be attached to the plow-beam by any devices suitable for the conditions required, as may also the colter. The plow itself may be of any known type or construction and may be a sulky-plow or be provided with handles, as usual.

In Fig. 1 I have exhibited the plow-beam 1, connected by a suitable clamp 10 to a yoke-frame 12, which connects with or forms part of the arched axle or frame 13.

As illustrated in Fig. 5, the pendent or standard portion 14 is provided with a forwardly-projecting sole-piece or shoe 15, adapted to be forced between the side flanges 16 of the plate 17, which is bolted to the mold-boards 3 and to the plow share or point 2. The rear end of the flanged plate 17 abuts against the standard 14 directly above the sole-piece 15, and one of the flanges abuts at its rear end against the standard at the point 19. The upper surface of the plate 17 inclines downward in opposite directions from its median line, so that such upper surface is approximately V-shaped, and it accurately fits the correspondingly-shaped under side of the plow share or point. The front end of the plate is slotted along its median line, as at 20, to receive the centrally-arranged lug or web 21 on the share or point 2, so that the rear end of the lug or web will bear against the inner end wall of the slot at the point 22. The side flanges 16 are secured to the sole-piece or shoe 15 in any suitable manner—as, for example, by transverse bolts, which I do not deem it essential to illustrate.

Having thus described my invention, what I claim is—

1. A duplex guard for plows, consisting of a shank adapted to be attached to a plow-beam and provided with two diverging plates having their rear extremities uniformly curved outwardly in opposite directions and inclined rearwardly from the upper to the lower edges of the plates for spreading and laying stalks, substantially as described.

2. The combination, with a plow and plow-beam, of a shank suspended from the beam and provided with two diverging plates having their rear extremities uniformly curved outwardly in opposite directions to form overhanging curves above the plane of the plow point or share for pressing the divided and spread stalks downward upon the soil, a shank suspended from the plow-beam and having a cutter located over the plow point or shank at a point between the plates and their shank, and the mold-board for severing the stalks, substantially as described.

3. The combination, with a plow-beam, a plow, and a rotary colter suspended above the plowshare, of a shank secured to the plow-beam and provided with two rearwardly-diverging plates extending at opposite sides of the colter and having their rear portions uniformly curved laterally in reverse directions for spreading and laying stalks, substantially as described.

4. The combination, with the mold-boards and the plow share or point having the central lug or web, of a plate secured to the mold-boards having an approximately V-shaped top surface and provided with centrally-arranged pendent side flanges and a slotted front end receiving the lug or web on the share or point, and the standard having at its lower end the horizontally-projecting sole-piece or shoe passing between the side flanges on the slotted plate, substantially as described.

In testimony whereof I have hereunto set my hand and affixed my seal in presence of two subscribing witnesses.

WILLIAM H. WILSON. [L. S.]

Witnesses:
F. C. OLIVER,
THOS. H. JONES.